United States Patent [19]

Benzel

[11] Patent Number: 5,445,031
[45] Date of Patent: Aug. 29, 1995

[54] PRESSURE-MEASURING ARRANGEMENT WITH HIGH LINEARITY

[75] Inventor: Hubert Benzel, Pliezhausen, Germany

[73] Assignee: Endress+Hauser GmbH+Co., Germany

[21] Appl. No.: 252,416

[22] Filed: Jun. 1, 1994

Related U.S. Application Data

[63] Continuation-in-part of Ser. No. 90,183, Jul. 22, 1993, abandoned.

[30] Foreign Application Priority Data

Nov. 28, 1991 [DE] Germany .................. 41 39 162.4
Dec. 19, 1991 [DE] Germany .................. 41 42 101.9

[51] Int. Cl.$^6$ .................. G01L 9/12; H01G 7/00; H01G 7/06
[52] U.S. Cl. .................. 73/724; 361/281
[58] Field of Search .................. 73/718, 724; 361/281; 29/25.41

[56] References Cited

U.S. PATENT DOCUMENTS

| | | | |
|---|---|---|---|
| 4,227,419 | 10/1980 | Park | 73/724 |
| 4,422,335 | 12/1983 | Ohnesorge et al. | 73/724 |
| 4,542,436 | 9/1985 | Carusillo | 361/283 |
| 4,743,836 | 5/1988 | Grzybowski et al. | 324/60 CD |
| 4,977,480 | 12/1990 | Nishihara | 361/283 |
| 5,020,377 | 6/1991 | Park | 73/718 |

FOREIGN PATENT DOCUMENTS

| | | |
|---|---|---|
| 0061359 | 9/1982 | European Pat. Off. . |
| 4107345 | 10/1992 | Germany . |
| 2157444 | 10/1985 | United Kingdom . |

OTHER PUBLICATIONS

Schoeneberg et al., "A CMOS-Readout-Amplifier For Instrumentation Applications", ESSCIRC90, pp. 208–211, 1990.

*Primary Examiner*—Richard E. Chilcot, Jr.
*Assistant Examiner*—William L. Oen
*Attorney, Agent, or Firm*—Barnes & Thornburg

[57] ABSTRACT

A pressure-measuring arrangement has a pressure-sensor structure with a diaphragm whose pressure-dependent deflection is measurable capacitively by means of a first electrode (=measuring electrode) disposed on the diaphragm and forming a measuring capacitance, $C_s$, together with a fixed counter-electrode. A second electrode forming a second pressure-dependent capacitance, $C_f$, together with the counter-electrode is implemented and disposed on the diaphragm. A third electrode forms a constant reference capacitance, $C_r$, together with the fixed counter-electrode. An evaluating circuit derives the pressure by a capacitance measurement and has the following transfer function:

$$F = [C_s(p) - C_r]/C_f(p).$$

The first electrode and the second electrode are separated by a boundary having an angularly extending profile optimized with respect to a minimal linearity error. This profile varies as a function of the variable radius of the first electrode and the variable radius of the second electrode.

6 Claims, 13 Drawing Sheets

FIG. 3B $\quad r^* = \dfrac{r}{R}$

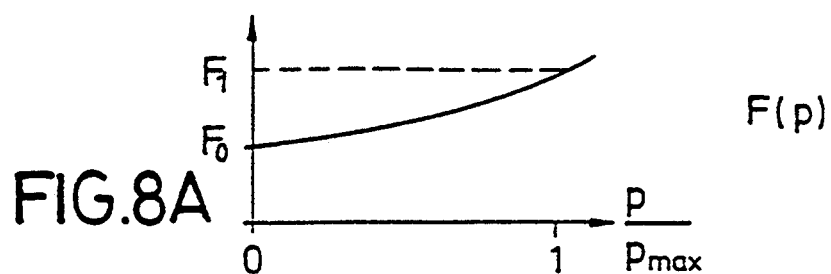
FIG.8A  F(p)
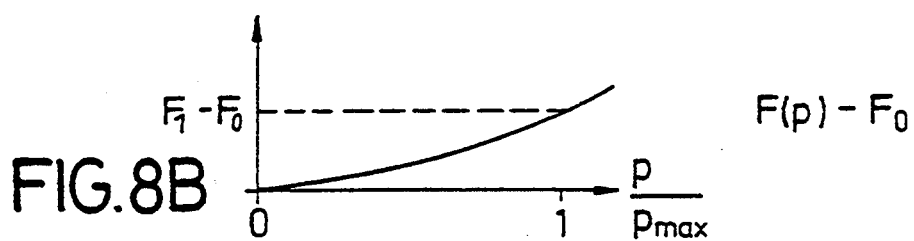
FIG.8B  F(p) − F₀
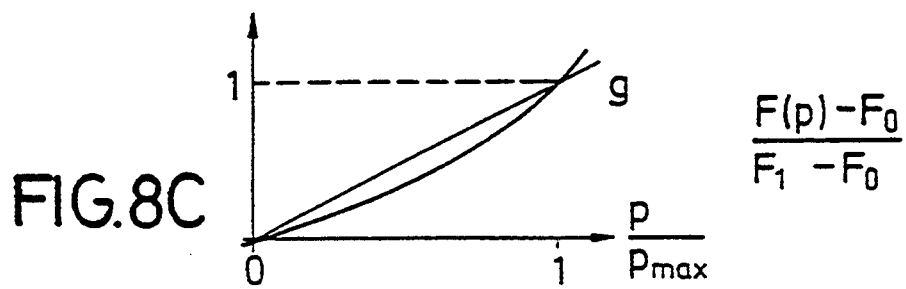
FIG.8C  $\dfrac{F(p)-F_0}{F_1-F_0}$
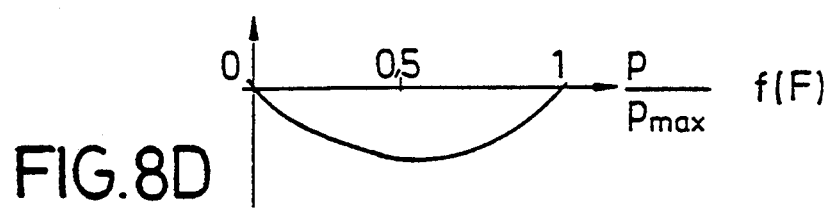
FIG.8D  f(F)

PRESSURE-MEASURING ARRANGEMENT WITH HIGH LINEARITY

This application is a continuation-in-part of application Ser. No. 08/090,183 filed Jul. 22, 1993, now abandoned.

FIELD OF THE INVENTION

The present invention relates to a pressure-measuring arrangement with a pressure sensor structure having a diaphragm whose pressure-dependent deflection is measurable capacitively by means of a measuring electrode forming a pressure-dependent measuring capacitance, and with an evaluating circuit which derives the pressure by capacitance measurement and whose transfer function is proportional to the difference between the measuring capacitance and a reference capacitance as well as inversely proportional to a further capacitance.

BACKGROUND OF THE INVENTION

A prior art pressure-measuring arrangement of the above kind is shown in FIGS. 17 to 19. A pressure sensor structure, generally designated by the reference numeral 1 and shown in a top view in FIG. 17 and in a schematic cross-sectional view in FIG. 19, comprises a sensor body 2 which defines a reference-pressure space 3 that is covered by a diaphragm 4. The diaphragm 4 comprises an inner, circular electrode 5, which forms with a (respective) counter-electrode (not visible in FIG. 17) on the sensor body 2 a pressure-dependent measuring capacitance $C_s$, and an outer, substantially annular electrode 6, which forms with the counter-electrode an essentially pressure-independent reference capacitance $C_r$.

An evaluating circuit for the prior art pressure-measuring arrangement is illustrated in FIG. 18 and includes a DC voltage source $U_G$. The reference capacitance $C_r$ is connectable via a first switching element S1 either to the DC voltage source UG or to the inverting input of an operational amplifier OPV, whose noninverting input is grounded. A capacitor $C_K$ is connected between the inverting input and the output of the operational amplifier OPV.

One electrode of the measuring capacitance $C_s$ is connectable either to the inverting input or to the output of the operational amplifier OPV by means of a second switching element S2, while the other electrode of the measuring capacitance $C_s$ is grounded.

A summing point SP is supplied with the voltage of the DC voltage source $U_G$ and with the output voltage, negative in sign, of the operational amplifier OPV. It is evident to those skilled in the art that the output voltage of the operational amplifier is proportional to the reference capacitance $C_r$ and inversely proportional to the measuring capacitance $C_s$. Since this output voltage is applied to the summing point SP with negative sign, the prior art circuit has the following transfer function F:

$$F = (C_s - C_r)/C_s$$

The following derivation will show that the curvature of the diaphragm 4 supporting the electrodes 5, 6 and shown very enlarged in FIG. 19 results in a nonlinearity of the output signal which is dependent on pressure to be measured.

For the deflection w(r) of the diaphragm, the following relation holds, assuming that the thickness h of the diaphragm 4 is much smaller than its diameter and greater than the deflection w:

$$w(r) = p(R^2 - r^2)^2/(64D) \quad (1)$$

where r is the radius under consideration, R is the radius of the diaphragm where it is fixed to the sensor body 2—in the following this radius will be designated "outer radius"—, p is the pressure, and D is the flexural strength. The latter is given by $$D = Eh^3/[12(1 - \delta^2)] \quad (2)$$

where E is the modulus of elasticity, h is the thickness of the diaphragm (see FIG. 19), and $\delta$ is Poisson's ratio.

For the pressure-dependent sensor capacitance $C_s(p)$, the following integral holds:

$$C_s(p) = \int_0^{r^*R} [2\epsilon_0 \pi r^* R (dr^*)]/[d - w(r^*)] \quad (3)$$

where $r^* = r/R$ is the normalized radius—therefore, at the sensor body 2 holds: $r^* = 1$—, and $\epsilon_0$ is the permitivity of vacuum. Solving the integral yields the following pressure dependence of the sensor capacitance $C_s(p)$—being Equation (4)—:

$$C_s(p) = 0.5 C_0 (p_0/p)^{0.5} \ln \frac{(p_0/p) + r^{*2}(p_0/p)^{0.5} + r^{*2} - 1}{(p_0/p) - r^{*2}(p_0/p)^{0.5} + r^{*2} - 1}$$

Equation (4) includes the basic capacitance $C_0$ and the support pressure $p_0$ as newly introduced constants. For these quantities, the following relations hold:

$$C_s(0) = r^{*2} C_0 \quad (5)$$

$$C_0 = \epsilon_0 \pi R^2 / d \quad (6)$$

$$p_0 = 16 d E h^3 / [3 R^4 (1 - \delta^2)] \quad (7)$$

It is apparent from the transfer function F of the evaluating circuit of FIG. 18 and from the pressure dependence of the pressure capacitance $C_s$ given in Equation (4) that the prior art pressure-measuring arrangement exhibits a nonlinear relationship between output voltage and pressure.

Since, to a first approximation, the characteristic of the sensor capacitance is hyperbolic, a certain linearization can be produced by forming the reciprocal, which is done in the prior art circuit of FIG. 18 by inserting the sensor capacitance Cs into the feedback path of the evaluating circuit. Such a prior art circuit is about four to five times more linear than pressure-measuring arrangements in which the measuring capacitance and the reference capacitance are located at the input and in the feedback path of an evaluating circuit respectively.

Since, however, the characteristic of the measuring capacitance or sensor capacitance $C_s$ is not exactly hyperbolic, it is not possible to generate a zero of the error function with a pressure-measuring arrangement as shown in FIGS. 17 to 19.

The publication U. Schöneberg et al., "A CMOS-Readout Amplifier For Instrumentation Applications", . . . , Ed. Frontières 1990, pages 208 to 217, shows a pressure sensor arrangement with an evaluating circuit having a transfer function which is proportional to the pressure-dependent measuring capacitance less a pressure-independent reference capacitance. The further capacitance given in the denominator of the transfer function is a constant quantity. This circuit serves to measure the capacitance value of capacitive sensors, and thus also of capacitive pressure sensors. This pressure-sensor arrangement with a capacitive pressure sensor and the evaluating circuit is designed for a single pressure-dependent capacitance, designated there by the reference characters CSEN1, CSEN2. All other capacitances of the prior art evaluating circuit are constant, pressure-independent quantities.

As was explained above, this prior art pressure-measuring arrangement has an output voltage which is nonlinear because of the nonlinear relation between pressure and sensor capacitance.

Based on this prior art, the invention has for its object to provide a pressure-measuring arrangement which exhibits increased linearity.

SUMMARY OF THE INVENTION

In accordance with the present invention, a pressure-measuring arrangement is provided comprising a pressure-sensor structure comprising a diaphragm whose pressure-dependent deflection is measurable capacitively by means of a first electrode being a measuring electrode disposed on the diaphragm and forming a first capacitance together with a fixed counter-electrode being a pressure-dependent measuring capacitance, a second electrode forming a second capacitance together with the fixed counter-electrode and disposed on the diaphragm in such a way that the second capacitance is pressure-dependent, the first and second electrodes each having a variable radius, a third electrode forming a constant reference capacitance together with the fixed counter-electrode, an evaluating circuit which derives the pressure by a capacitance measurement and has the following transfer function:

$$F = [C_s(p) - C_r]/C_f(p)$$

where $C_s$ is the measuring capacitance, $C_r$ is the constant reference capacitance, and $C_f$ is the second capacitance, and wherein the first electrode and the second electrode are separated by a boundary having an angularly extending profile which varies as a function of the variable radius of the first electrode and the variable radius of the second electrode.

The invention is based on the fundamental concept that improved linearity of a pressure-measuring arrangement can be achieved if the pressure sensor structure includes a second electrode forming a pressure-dependent, second capacitance $C_f$, and if an evaluating circuit is used whose transfer function is proportional to the difference between measuring capacitance $C_s$ and reference capacitance $C_r$ divided by the second capacitance $C_f$. The use of such an additional pressure-dependent capacitance $C_f$ in an evaluating circuit with the above transfer function makes it possible to produce a zero in the error function f.

In the transfer function F, the difference between measuring capacitance $C_s$ and reference capacitance $C_r$ is so weighted with the second capacitance, which may be connected as a feedback capacitance $C_f$, that in the error function f, a zero is produced at the center of the desired pressure range. This eliminates the quadratic linearity error of the prior art pressure sensor arrangements.

To increase the linearity, the invention, based on this fundamental concept, provides that the measuring electrode and the second electrode, which are both disposed on the diaphragm, have radius-dependent angles to be explained in detail below.

Preferred developments are defined in the subclaims.

BRIEF DESCRIPTION OF THE DRAWINGS

Preferred embodiments of the pressure-measuring arrangement will now be explained in more detail with reference to the accompanying drawings, in which:

FIG. 8 contains diagrams serving to explain the normalization of the functions;

DETAILED DESCRIPTION OF THE DRAWINGS

Figure 1:
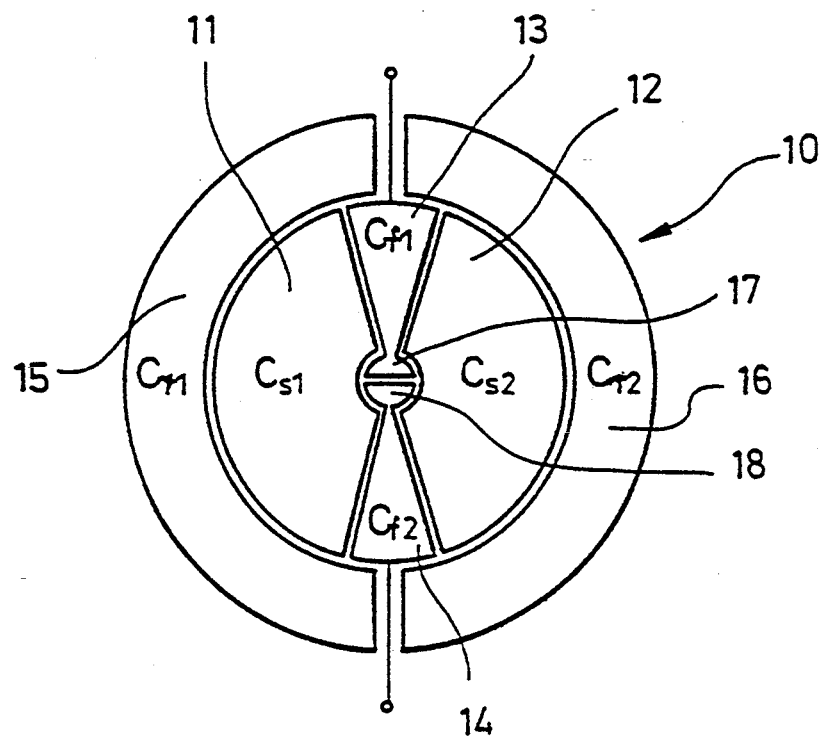
FIG. 1 shows a first example of a pressure sensor structure of a pressure-measuring arrangement in accordance with the fundamental concept.

Referring to FIG. 1, the pressure sensor structure according to the first example of the fundamental concept, generally designated by the reference numeral 10, comprises two essentially sectorial electrode areas 11, 12, which form two measuring capacitance $C_{s1}$, $C_{s2}$, and two further likewise essentially sectorial electrode areas 13, 14, which form two further pressure-dependent capacitances $C_{f1}$, $C_{f2}$.

These electrode areas 11, 12, 13, 14 are surrounded by two reference electrode areas 15, 16 which are spaced from the electrode areas 11, 12, 13, 14. The reference electrode areas 15 and 16 each have the shape of an essentially semicircular ring and form a first reference capacitance $C_{r1}$ and a second reference capacitance $C_{r2}$, respectively.

The areas and, hence, the capacitances $C_{f1}$, $C_{f2}$ of the further electrode areas 13, 14 are smaller than those of the essentially sectorial electrode areas 11, 12, which form the measuring capacitances $C_{s1}$, $C_{s2}$. The essentially sectorial electrode areas 11, 12, which form the measuring capacitances $C_{s1}$, $C_{s2}$, have a smaller percentage share in the central area of the diaphragm than the further essentially sectorial electrode areas 13, 14, which form the further capacitances $C_{f1}$, $C_{f2}$. As a result, the percentage change in the further capacitances $C_{f1}$, $C_{f2}$ as a function of the pressure is greater than the percentage change in the measuring capacitances $C_{s1}$, $C_{s2}$ as a function of the pressure.

This realization of the pressure dependence of the measuring capacitances $C_{s1}$, $C_{s2}$ and the further capacitances $C_{f1}$, $C_{f2}$ contributes to a further improvement in the linearity of the pressure sensor structure. In the example shown in FIG. 1, the stronger pressure dependence of the further capacitances $C_{f1}$, $C_{f2}$ referred to the pressure dependence of the measuring capacitances $C_{s1}$, $C_{s2}$ is achieved by providing the essentially sectorial electrode areas 11, 12 with a circular recess in their inner radial region, while the further essentially sectorial electrode areas 13, 14 form semicircular electrode area elements 17, 18 in the central region.

Figure 2:
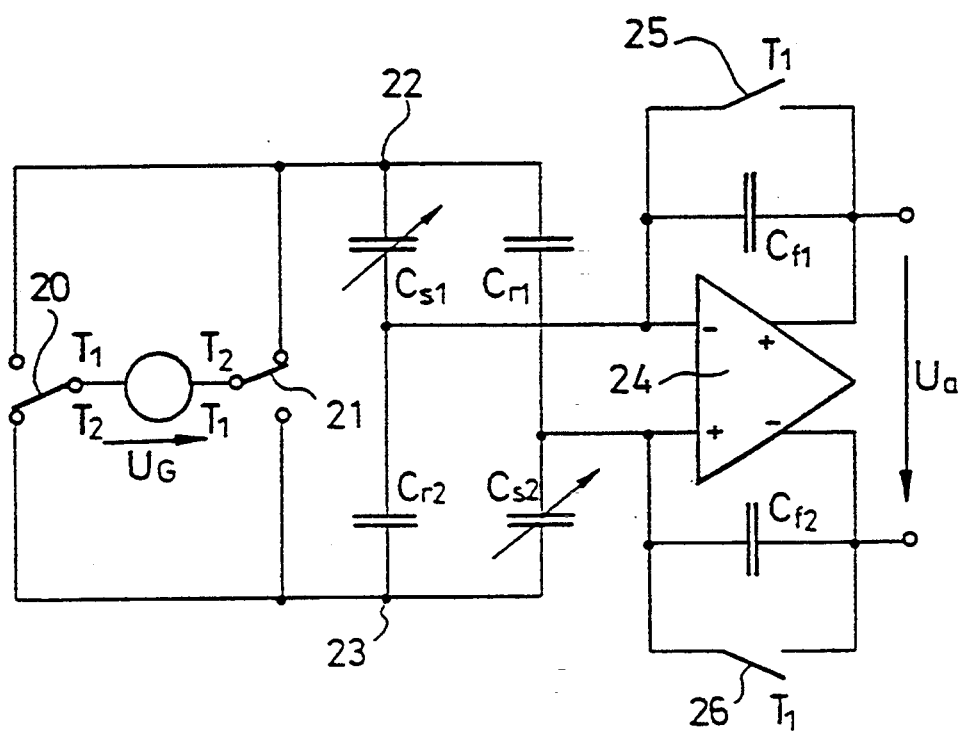
FIG. 2 shows a first example of an evaluating circuit for the pressure sensor structure of FIG. 1.

FIG. 2 shows a first example of an evaluating circuit. A DC voltage source $U_G$ is connectable in alternating polarity to a first and a second node 22, 23 by means of a first and a second switch 20, 21. Connected between the nodes 22, 23 are, on the one hand, the series combination of the first measuring capacitance $C_{s1}$ and the second reference capacitance $C_{r2}$ and, on the other hand, the series combination of the first reference capacitance $C_{r1}$ and the second measuring capacitance $C_{s2}$.

The node of the measuring capacitance $C_{s1}$ and the reference capacitance $C_{r2}$ and the node of the reference capacitance $C_{r1}$ and the measuring capacitance $C_{s2}$ are coupled to the inputs of a differential-path amplifier 24. Connected between the inverting input and the noninverting output of the differential-path amplifier 24 is the first further pressure-dependent capacitance $C_{f1}$.

Connected between the noninverting input and the inverting output is the second further pressure-dependent capacitance $C_{f2}$. These further pressure-dependent capacitances $C_{f1}$, $C_{f2}$ are shunted by a third switch 25 and a fourth switch 26, respectively, which are activated simultaneously to discharge these capacitances in synchronism with the operation of the switches 20, 21.

In the following description of the second example of the pressure sensor structure of FIGS. 3A, 3B and of the evaluating circuit of FIG. 4, parts and circuit elements corresponding to the examples of FIGS. 1 and 2 will be designated by the same reference characters, so that the following description can be restricted to the deviations of the second example of the pressure sensor structure and the evaluating circuit from the respective first example.

Figure 3A:
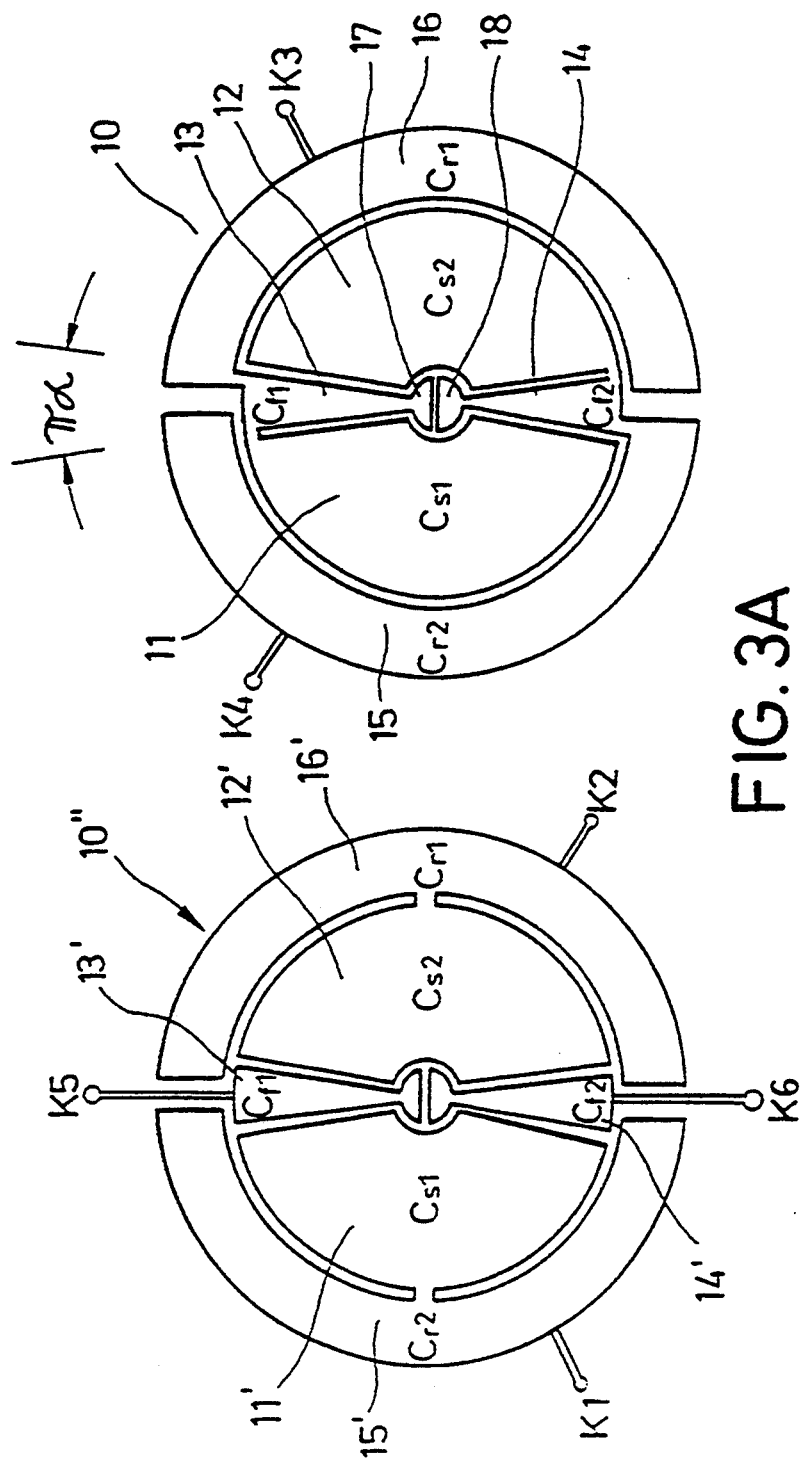
FIG. 3 shows a second example of a pressure sensor structure for a pressure sensor arrangement in accordance with the fundamental concept.

FIG. 3A shows the arrangement of the electrodes on the diaphragm, while FIG. 3B illustrates the arrangement of the counter-electrodes at the bottom of the sensor body 2. The arrangement of FIG. 3B corresponds to the structure shown in FIG. 1. The corresponding opposite electrodes on the diaphragm side, shown in FIG. 3A, are designated by like reference characters and provided with a prime. In the case of the bottom electrodes, the first reference electrode area 16 is connected to the first further sectorial electrode area 13 and the first sensor electrode 11. Similarly, the second further sectorial electrode area 14 is connected to the second reference electrode area 15 and the second sensor electrode 12 (corresponds to connection between nodes K1 and K2—three capacitors interconnected).

On the diaphragm-electrode side, the first sectorial electrode area 11' is linked with the second reference electrode area 15'. Similarly, the second sectorial electrode area 12' is linked with the first reference electrode area 16'. The two reference electrode areas 15', 16' on the diaphragm-electrode side are provided with a first and a second contact K1, K2. Similarly, the two second electrode areas 13', 14' are provided with a fifth and a sixth contact K5, K6. On the bottom-electrode side, the two reference electrode areas 15, 16 are provided with a third and a fourth contact K3, K4.

Figure 4:
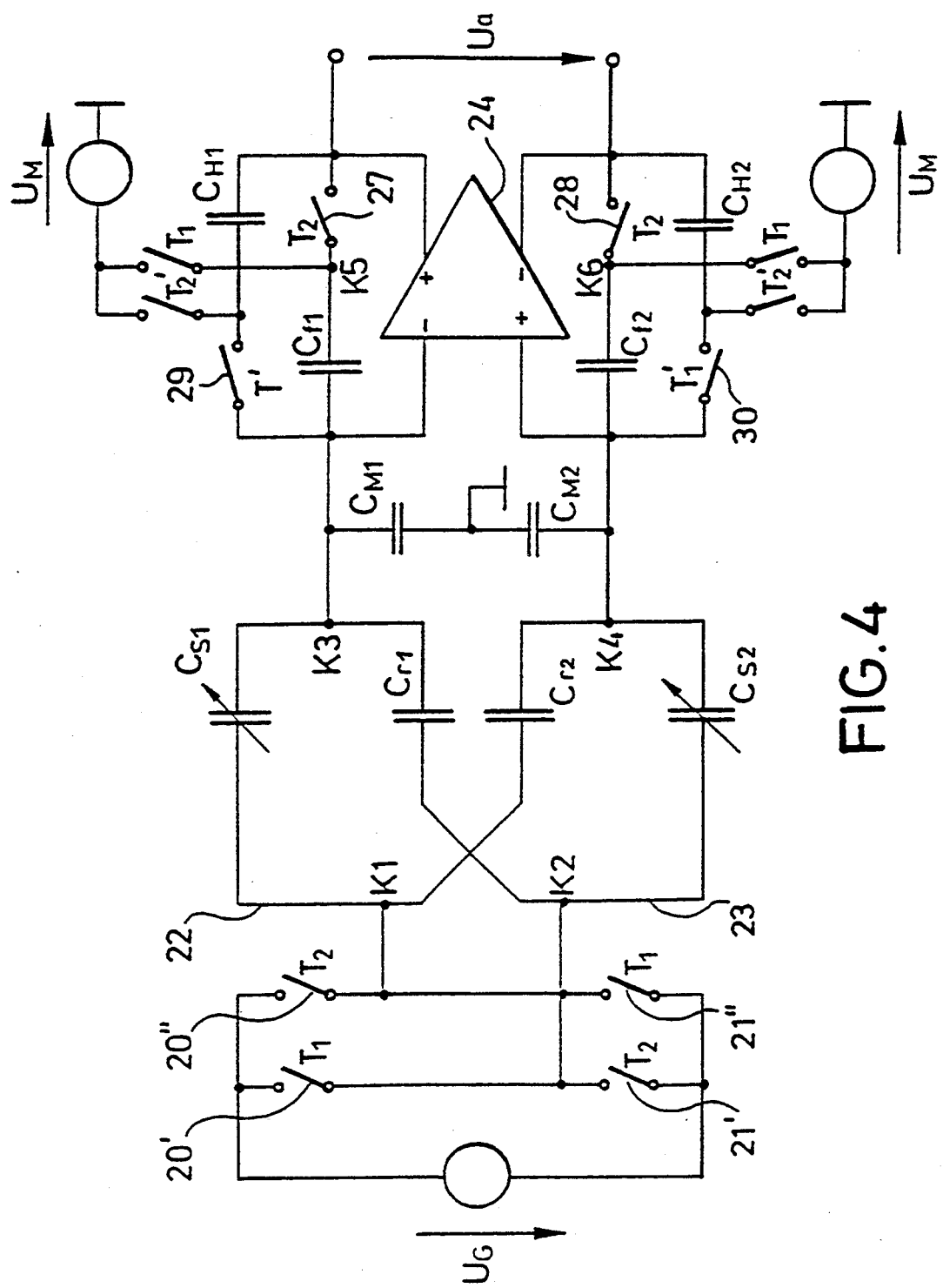
FIG. 4 shows a second example of an evaluating circuit for the second example of the pressure sensor structure, shown in FIGS. 3.

In FIG. 4, the double-throw switches 20, 21 of FIG. 2 have been replaced by single-throw switches 20', 20'', 21', 21''. As can be seen, the first node 22 is connected to the first contact K1, and the second node 23 is connected to the second contact K2. The third contact K3 is connected to the inverting input of the differential-path amplifier 24. The fourth contact K4 is connected to the noninverting input of this amplifier. Two further, parasitic capacitances $C_{M1}$, $C_{M2}$ are connected between these inputs and ground.

Connected in series with the further pressure-dependent capacitances $C_{f1}$, $C_{f2}$ are a fifth switch 27 and a sixth switch 28, respectively, which are operated with a second clock signal $T_2$, which also controls the switches 21', 20''. The series combination of the second pressure-dependent capacitance $C_{f1}$ and the switch 27 is shunted by the series combination of a first hold capacitance $C_{H1}$ and a seventh switch 29, and the series combination of the further pressure-dependent capacitance $C_{f2}$ and the switch 28 is shunted by the series combination of a second hold capacitance $C_{H2}$ and an eighth switch 30. The seventh and eighth switches 29, 30 are closed with a clock signal $T_1'$, which is delayed with respect to a first clock signal $T_1$, with which the switches 20', 21'' are closed.

The node of the first hold capacitance $C_{H1}$ and the seventh switch 29 as well as the node of the second hold capacitance $C_{H2}$ and the eighth switch 30 are connectable to associated voltage sources $U_M$ by means of a ninth switch 31 and a tenth switch 32, respectively, on the occurrence of the delayed second clock signal $T_2'$, and the node of the further pressure-dependent capacitance $C_{f1}$ and the fifth switch 27 as well as the node of the further pressure-dependent capacitance $C_{f2}$ and the sixth switch 28 are connectable to the associated voltage sources $U_M$ by means of an eleventh switch 33 and a twelfth switch 34, respectively, on the occurrence of the first clock signal $T_1$.

Figure 5:
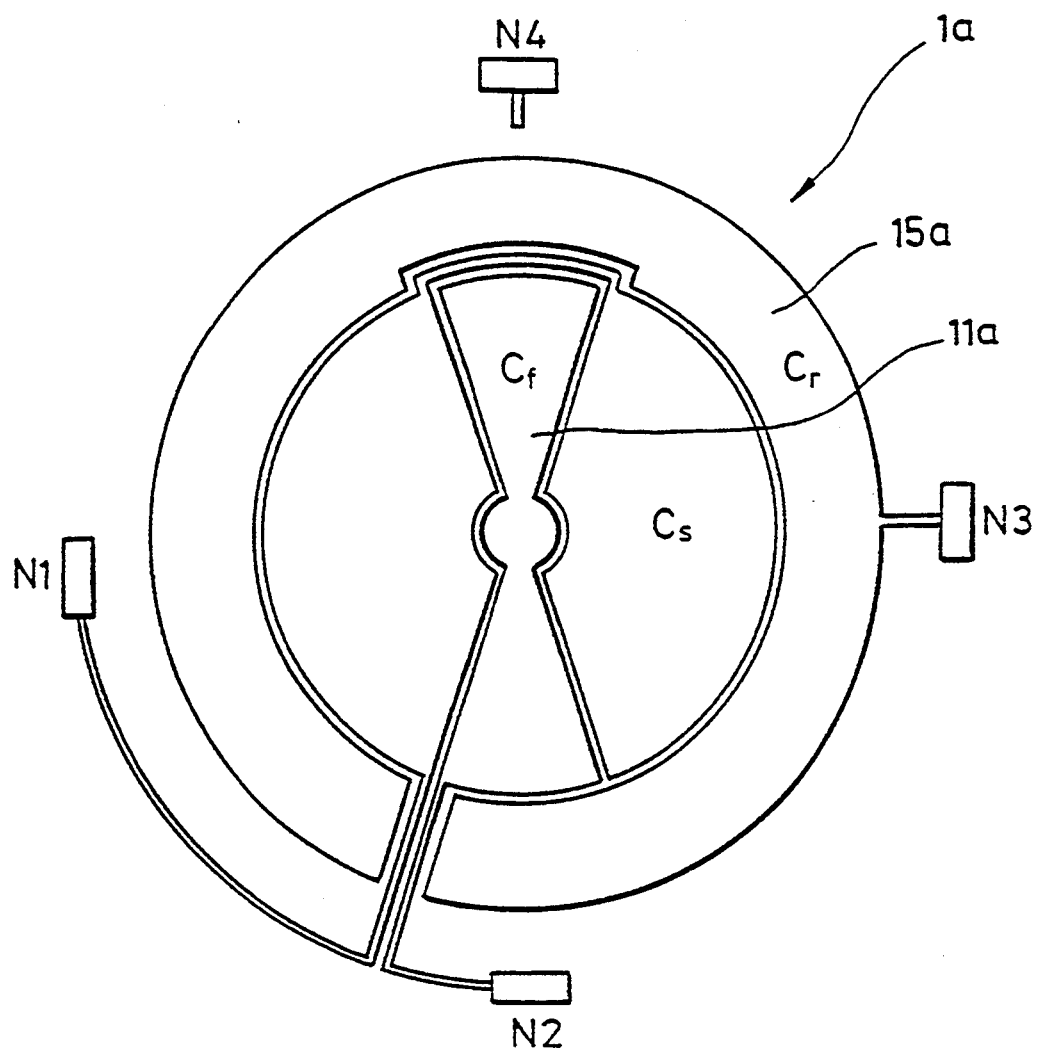
FIG. 5 shows a third example of a pressure sensor structure of a pressure-measuring arrangement in accordance with the fundamental concept.

FIG. 5 shows a third example of a pressure sensor structure. Those of its parts which correspond to the pressure sensor structures of FIGS. 1 and 3B are designated by like reference characters and have been supplemented with the distinguishing character "a". Consequently, like or similar parts need not be described again.

The pressure sensor structure 1a of FIG. 5 differs from the pressure sensor structures of FIGS. 1 and 3B essentially in that a single reference electrode area 15a is provided which has essentially the shape of a nearly completely closed ring. This reference electrode area 15 forms a single reference capacitance $C_r$.

In the area of the semicircular electrode area elements 17, 18 of the examples of FIGS. 1 and 3B, the two further essentially sectorial electrode areas 13, 14 now form a single second electrode area 11a, which provides a second pressure-dependent capacitance $C_f$. Similarly, in the example of FIG. 5, the two essentially sectorial electrode areas 11, 12 of the example of FIG. 1 are interconnected and form a single measuring capacitance $C_s$.

The measuring capacitance $C_s$, the second pressure-dependent capacitance $C_f$, and the reference capacitance $C_r$ are measurable at terminals N1, N2, and N3, respectively. The second terminal N4 of FIG. 5 serves to make contact to a counter-electrode (not shown) covering the whole surface.

Figure 6:
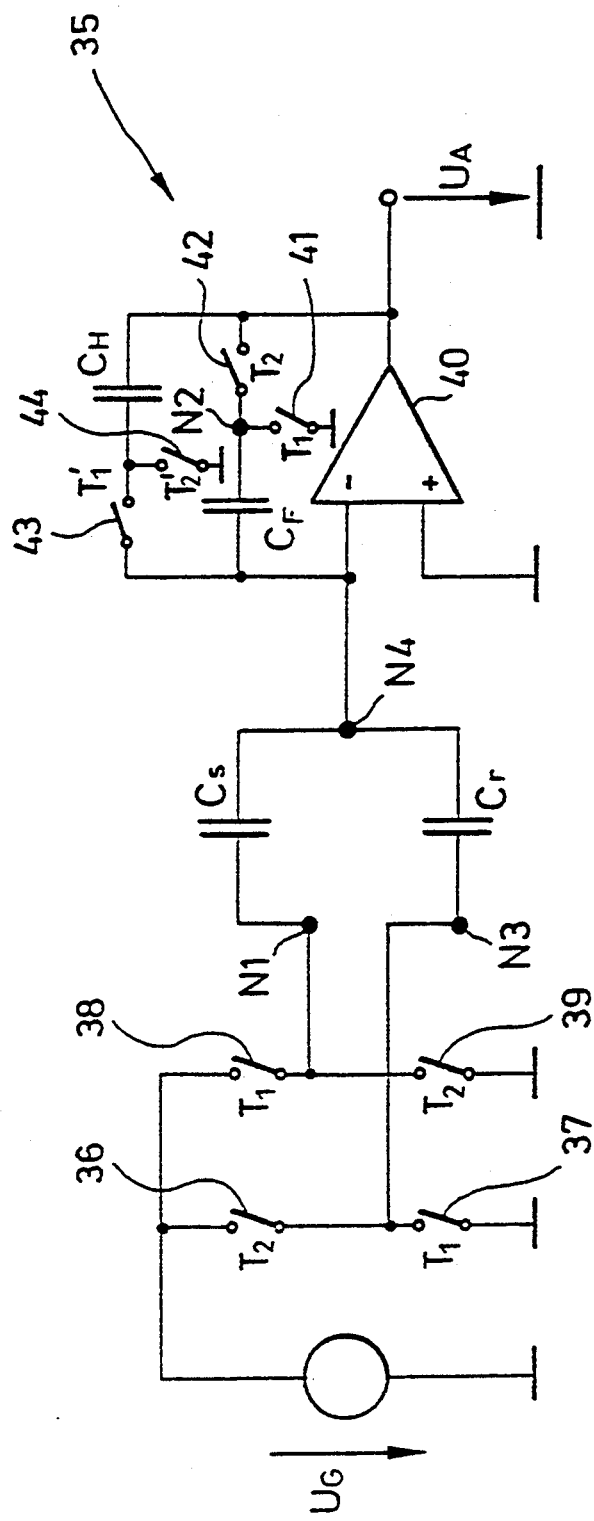
FIG. 6 shows a third example of an evaluating circuit for the pressure sensor structure of FIG. 5.

The evaluating circuit of FIG. 6, generally designated by the reference numeral 35, includes a DC voltage source $U_G$ which is connectable via four switches 36 through 39 to a first terminal N1 and a third terminal N3 in a first and a second polarity, respectively, as described above. The fourth terminal N4 of the pressure sensor structure 1a is connected to the inverting input of an amplifier 40, whose noninverting input is grounded. The second terminal N2, to which the reference electrode 15a is connected, can be grounded by means of a fifth switch 41 and is connectable to the output of the amplifier 40 by means of a sixth switch 42.

Figure 7:
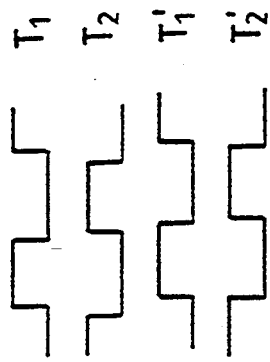
FIG. 7 shows waveforms of control signals within the circuit of FIG. 6.

A hold capacitance $C_H$ is connected in parallel with this feedback path and in series with a seventh switch 43. The node of the seventh switch 43 and the hold capacitance $C_H$ can be grounded through an eighth switch 44. The switches 36, 39 are controlled by a second clock signal $T_2$. The first and second switches 37, 38 are controlled by a first clock signal $T_1$. The waveforms of these clock signals are shown in FIG. 7.

The fifth switch 41 is controlled by the first clock signal $T_1$, while the sixth switch 42 is controlled by the second clock signal $T_2$. The seventh and the eighth switches 43, 44 are controlled by the delayed first and second clock signals $T_1'$, $T_2'$, respectively, which are delayed with respect to the first and the second clock signals $T_1$, $T_2$.

At the beginning of this specification, the pressure-dependent capacitance of a capacitive pressure sensor of the diaphragm type was derived using Equations (1) through (7). The following will show that, compared with the prior art pressure sensor structure, the pressure sensor structure according to the fundamental concept just described has a considerably reduced linearity error.

But the linearity error of this pressure sensor structure can be further optimized not only by means of simple experiments, but also mathematically, which can be done by means of the relationships derived in the following.

The reference capacitance $C_r$ with the structure shown in FIG. 1 is calculated as the capacitance of an annulus from Equation (4) as follows—for some geometrical relations see also FIG. 10:

$$C_r(p) = C(p, r^*_{ra}) - C(p, r^*_{ri}) \tag{8}$$

With no pressure applied, the basic capacitance value $C_r(0)$ is $$C_r(0) = (r^*_{ra}{}^2 - r^*_{ri}{}^2)C_0 \tag{9}$$

The transfer function F of the evaluating circuit is $$F = \frac{(C_{s1} + C_{s2}) - (C_{r1} + C_{r2})}{C_{f1} + C_{f2}} = \frac{(C_s - C_r)}{C_f} \tag{10}$$

As indicated in FIG. 3B, the angle $\pi\alpha$ is the radian measure of the second sectorial electrode areas 13, 14. $r^*_1$ is the normalized radius of the semicircular electrode area elements 17, 18. $r^*_{s1}$ is the normalized inside radius of the sectorial electrode areas 11, 12. $r^*_{s2}$ is the normalized outside radius of these electrode areas. $r^*_{r1}$ is the normalized inside radius of the reference electrode areas 15, 16. Obviously, $r^*_{ri}$ corresponds to $r^*_{r1}$ and $r^*_{ra}$ to R.

Using Equation (10), for the transfer function F holds:

$$F = \frac{(1 - \alpha)[C_s(p, r^*_{s2}) - C_s(p, r^*_{s1})]\alpha_s - C_r\alpha_r}{\alpha C_s(p, r^*_{s2}) \oplus (1 - \alpha)[C_s(p, r^*_1)]\alpha_f} \tag{11}$$

where $\alpha_s$ relates to the sensor electrode, $\alpha_r$ to the reference electrode, and $\alpha_f$ to the second (or feedback) electrode.

The normalization of the functions will now be explained with reference to FIGS. 8A through 8D. FIG. 8A shows the pressure-dependent profile of the transfer function F, with $F_1$ denoting the maximum value, and $F_0$ the minimum value.

FIG. 8B shows the profile of $F(p) - F_0$.

FIG. 8C shows the curve of FIG. 8B referred to the swing, i.e., $[F(p) - F_0]/(F_1 - F_0)$.

Hence the linearity error f(F) shown in FIG. 8C is $$f(F) = [F(p) - F_0]/(F_1 - F_0) - p/p_{max} \tag{12}$$

Using a computer-aided optimization technique, such as the Levenberg-Marquardt technique, the linearity error f(F) is optimized by varying the following parameters:

$\alpha$: angle of the sensor sectors 13, 14;
$r_1$: radius of the electrode area element 17, 18;
$r_r$: inside radius of the reference electrode 15, 16;
$r_s$: outside radius of the sensor electrode 11, 12.

The following objective functions were specified:
FA = F(p=0)→0;
FB = F(p=0.5$p_{max}$) − 0.5→0;
FC = F(p=$p_{max}$) − 1→0;
FD = $r_s$ + $d_{min}$ − $r_r$→0, where $p_{max}$ is the maximum applied nominal pressure and $d_{min}$ is the minimum of the electrode spacing $d_m$ (see FIG. 10).

Figure 9:
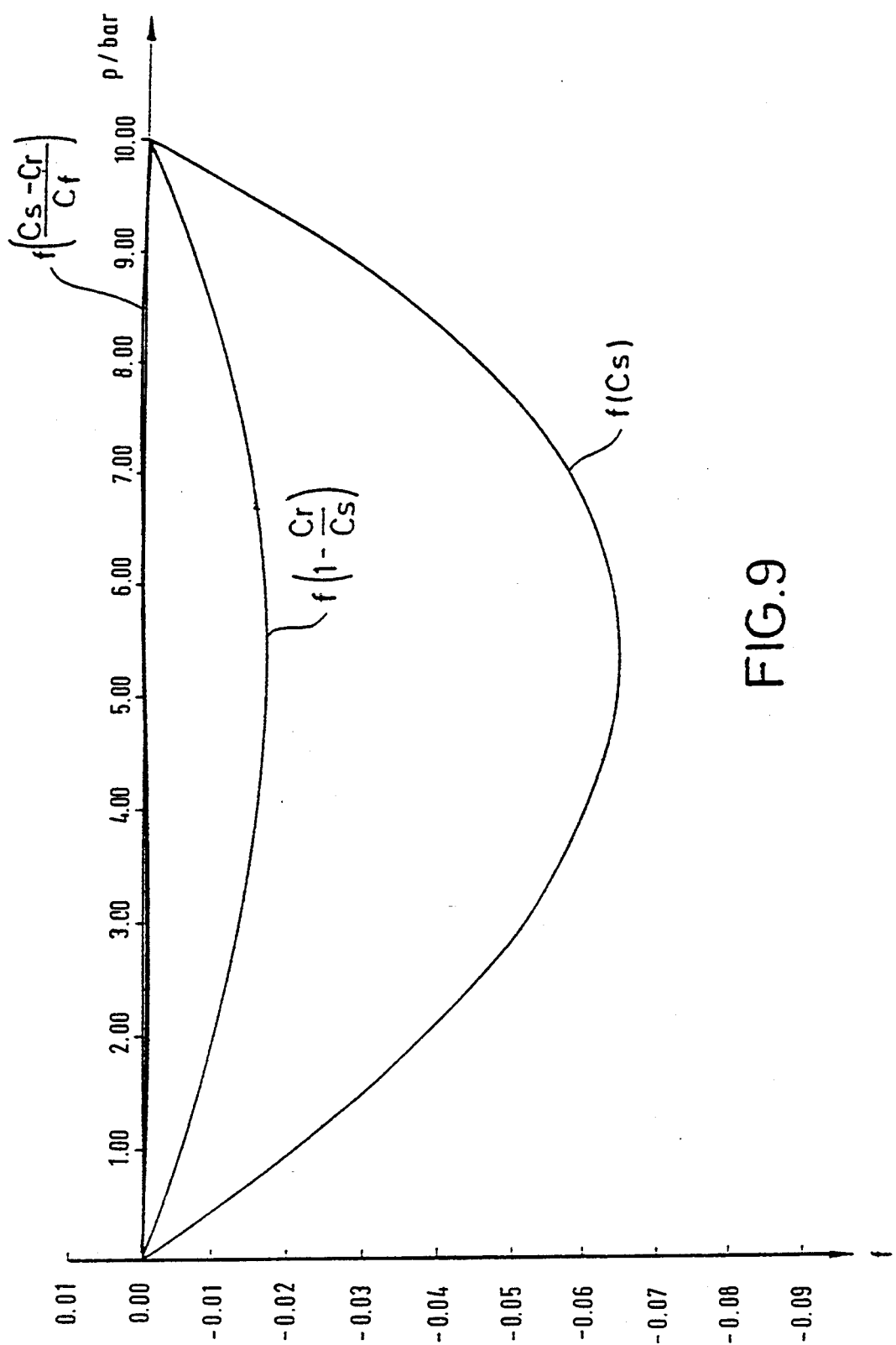
FIG. 9 is a diagram showing the linearity error of prior art pressure-measuring arrangements as a function of the measured pressure in comparison with the linearity error of the pressure-measuring arrangement in accordance with the fundamental concept.

In FIG. 9, the linearity error according to Equation (12) of the normalized output voltage for the prior art pressure sensor structure with a capacitive pressure sensor element in the input branch is denoted by f($C_s$). The linearity error of an improved prior art circuit is denoted in FIG. 9 by f(1 − $C_r/C_s$).

As can also be seen in FIG. 9, the linearity error of the circuit, denoted by f([$C_s − C_r$]/$C_f$), is a function which, compared with the best attainable linearity error curve of pressure sensor structures with only two electrodes, is improved approximately by a factor of 10.

If, instead of the optimization with four parameters as just described, further parameters are used for linearization, a further improvement in linearity can be achieved.

Figure 10:
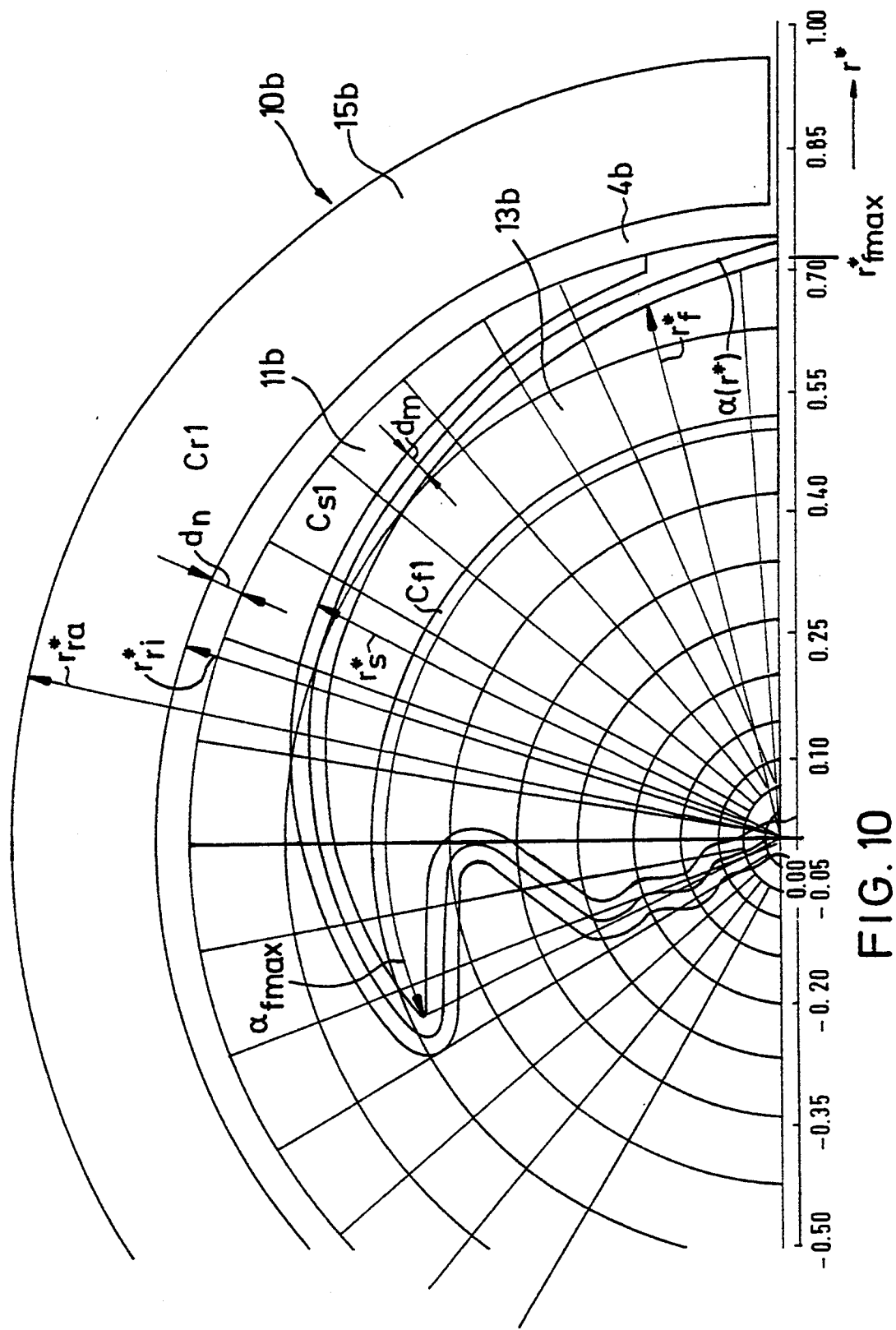
FIG. 10 is a diagram showing in polaric co-ordinates the radius-dependent angles of a measuring electrode and of a second electrode of an embodiment of the pressure sensor structure of a pressure-measuring arrangement in accordance with the invention.

As it becomes evident from FIG. 10, the electrode 15b of the reference capacitance $C_{r1}$ is substantially a half-circle ring with the inner normalized radius $r^*_{ri}$ and the outer normalized radius $r^*_{ra}$ and, therefore, the reference capacitance $C_{r1}$ is proportional to the area of that half-ring. These normalized radii have in FIG. 10 the numerical values of $r^*_{ri}=0.97$ and $r^*_{ra}=0.78$.

Further, the area of the electrode 13b of the second capacitance $C_{f1}$ and hence the second capacitance $C_{f1}$ itself is proportional to $\alpha(r^*_f)$, the latter having the following fixed values:

For $\alpha=0°$: $r^*_{fmax}=r^*_{ri}-d_m-d_n$, and
for $\alpha=90°$: $r^*_f=0$ where $d_n$ being the substantially constant distance between the electrodes 11b, 15b.

Finally, the area of the electrode 11b of the measuring capacitance $C_{s1}$ and hence this capacitance $C_{s1}$ itself is proportional to $\alpha(r^*_{ri}-d_m-d_n-r^*_f) \approx \alpha(r^*_{ri}-r^*_f)$; the latter approximation holds, if $d_m$, $d_n$ can be neglected as being small. This proportionality function has the following fixed values:

For $\alpha=0°$: $r^*_s=r^*_{ri}-d_m-d_n-r^*_{fmax}$, and
for $180°>\alpha>\alpha_{fmax}$: $r^*_s=r^*_{fmax}$.

According to the invention, unlike in the sensor structure described by way of example with reference to FIG. 1, the measuring electrode 11b and the second electrode 13b are separated by a boundary line having a radius-dependent angularly extending profile $\alpha(r^*)$ and the areas are complementary to this line within a half circle having the normalized radius $r^*_{ri}-d_n$. In other words, the angularly extending profile $\alpha(r^*)$ changes as a function of the radius $r^*_f$ of electrode 13b and the radius $r^*_s$ of electrode 11b, respectively.

The measuring electrode and the second electrode are separated by an essentially constant distance $d_m$. This distance relates to the distance of the electrodes 11b, 13b perpendicular to the respective radius-dependent angularly extending profile $\alpha(r^*)$.

Together, these two pressure-dependent measuring electrodes 11b, 13b cover the region of the diaphragm 4b up to a normalized radius of 0.74 with the exception of the aforementioned region formed by the distance $d_m$, while the reference electrode 15b, in the embodiment shown here, covers the radial outer annular region (without the aforementioned region formed by the distance $d_n$) within a normalized radius range from 0.78 to 0.97.

As particularly a comparison of FIGS. 10, 13, 14, 15, 16 shows centrosymmetric subelectrode pairs with arbitrary external interconnection may be provided which each cover the electrode areas shown in FIG. 10.

It is also possible, of course, to realize only a single measuring electrode and a single second electrode as well as a single reference electrode on a single diaphragm. In that case, the second half portion of the electrode may adjoin mirror-symmetrically the electrode half shown in FIG. 10, so that both the measuring electrode and the second electrode each have the double radius-dependent angularly extending profile.

It is also possible, with the same advantage, to further subdivide the area of the full circle, e.g., into quadrants or octants on each of which are realized one measuring electrode and one second electrode with a radius-dependent angularly extending profile of the mutual boundary. In that case, the angles given in FIG. 11 must be referred to the respective sectorial electrode area rather than to the semicircle of 180°.

As can be seen in FIG. 10, the angularly extending profile given there, $\alpha(r^*)$, corresponds essentially to the angularly extending profile of the second electrode 13b, which forms the second pressure-dependent capacitance $C_{f1}$. Conversely, the angularly extending profile of the measuring electrode 11b corresponds to the values thereof minus the distance $d_m$.

In other words, in the embodiment of FIG. 10, the two radial extensions of the two pressure-dependent electrodes 11b, 13b, with the exception of the above-mentioned distance $d_m$, supplement each other to make the half-circle shown. However, the sum of the angles may also be equal to a full circle of 360° or an arbitrary portion thereof.

Figure 11:
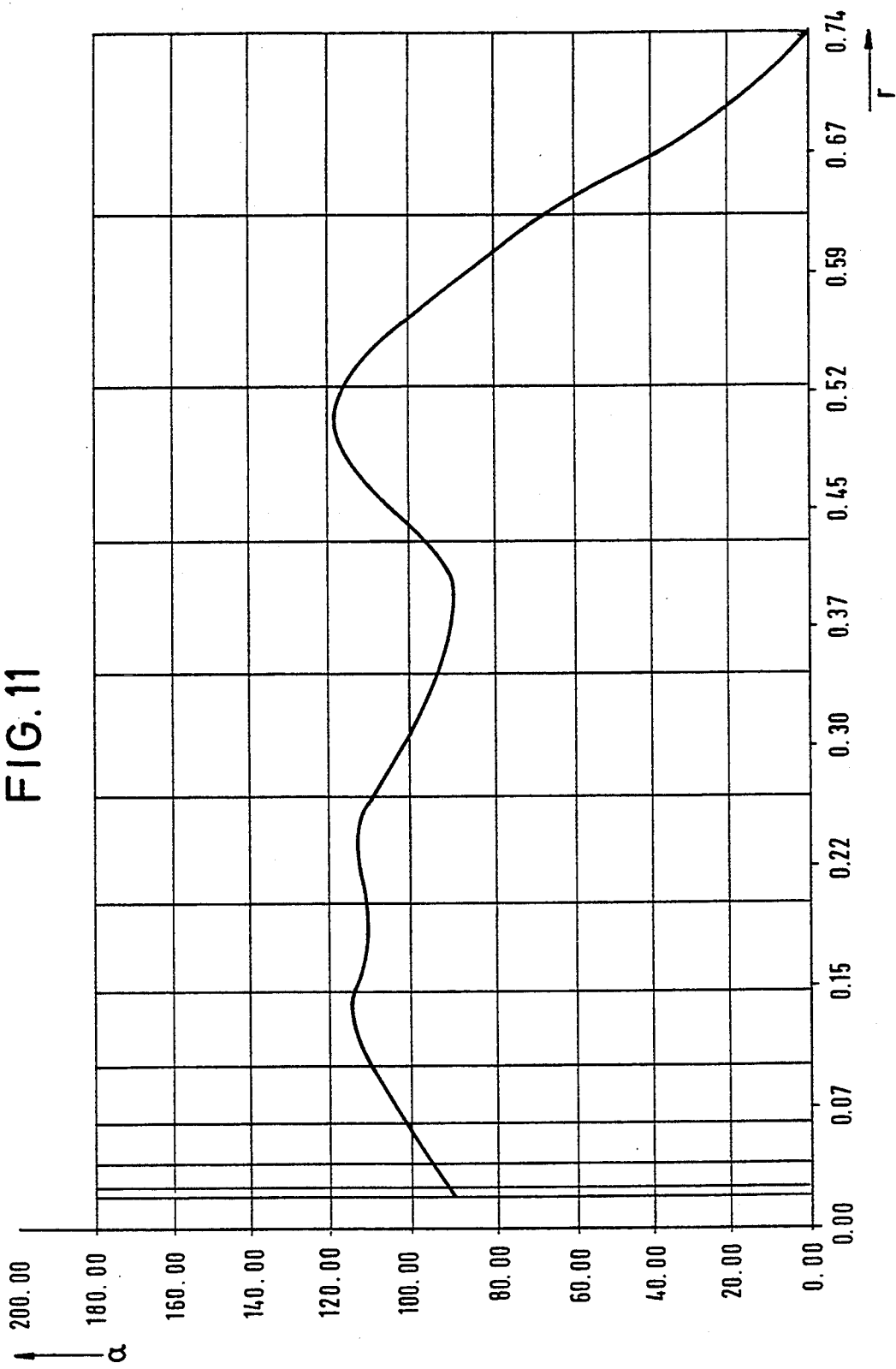
FIG. 11 shows in Cartesian co-ordinates the angle profile of the electrode structure of FIG. 10.

FIG. 11 shows the radius-dependent angularly extending profile referred to the normalized radius in Cartesian coordinates. As mentioned, the reference electrode 15b lies on a normalized radius range from about 0.78 to 0.97. Therefore, the measuring electrode 11b and the second pressure-dependent electrode 13b extend only up to a normalized radius of 0.74.

The angularly extending profile begins at the center at a value of 90°, rises continuously up to a value of approximately 115° at a normalized radius of 0.14, shows a first slight minimum of about 111° at a normalized radius of about 0.18, shows a second weak minimum of about 116° at a normalized radius of about 0.24, and then falls continously to a minimum value of 90° at a normalized radius of about 0.375, which is followed by a continuous rise up to a distinct maximum of about 118° at a normalized radius of 0.5. After that, the radius-dependent angle decreases to a value of 0°, which is reached at the normalized radius of 0.74.

FIGS. 13, 14 and FIGS. 15, 16 show electrode pairs belonging together. The top and bottom electrodes of FIGS. 13, 14 have the same shape, which corresponds to the shape described with reference to FIG. 10. The electrode pairs of FIGS. 15 and 16 differ in that the counter-electrode of FIG. 16 covers the whole surface, while the electrode structure of FIG. 15 differs from that of FIG. 10 in that the two second pressure-dependent electrodes $C_f$ are interconnected by a link extending through the center, while the two measuring electrodes $C_s$ are interconnected by a radially extending link.

Figure 13:
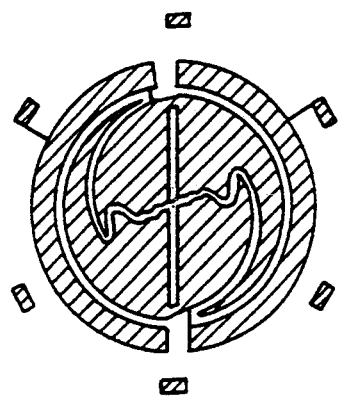
FIGS. 13 to 16 show different electrode structures in accordance with the invention.
Figure 14:
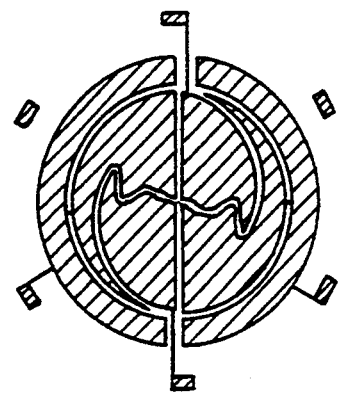
Figure 15:
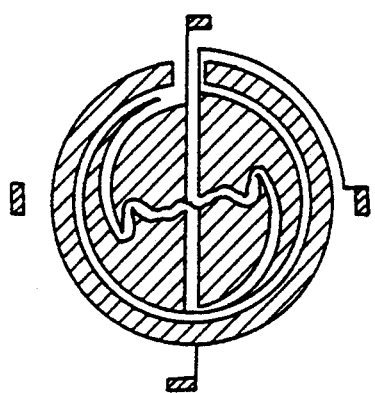
Figure 16:
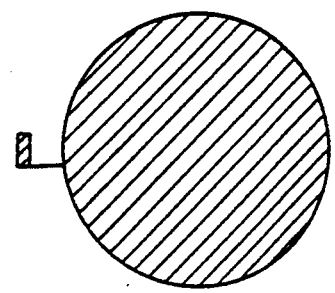
Figure 17:
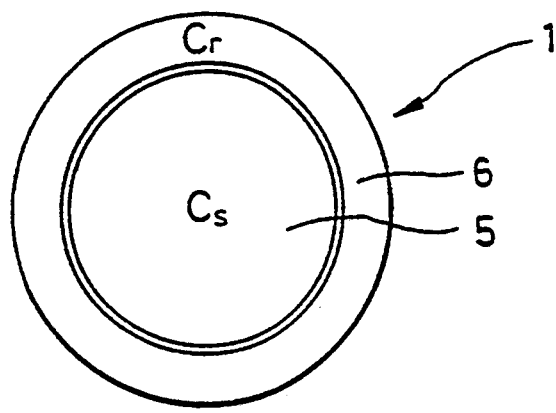
FIG. 17 shows a pressure sensor structure of a prior art pressure-measuring arrangement.
Figure 18:
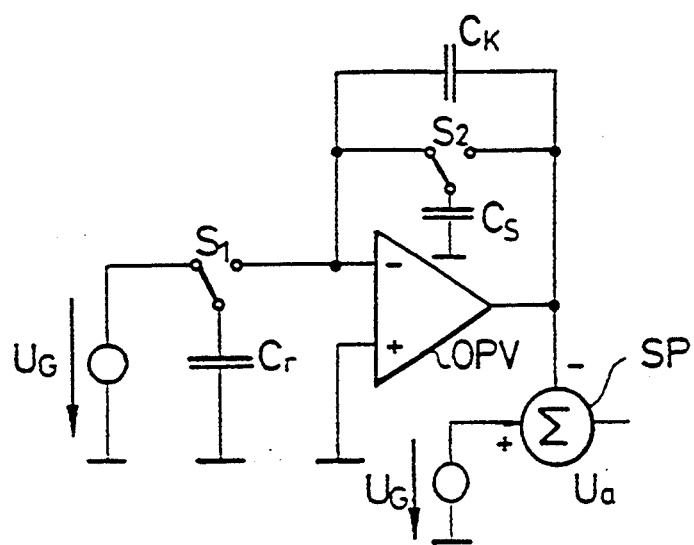
FIG. 18 shows an evaluating circuit of a prior art pressure-measuring arrangement.
Figure 19:
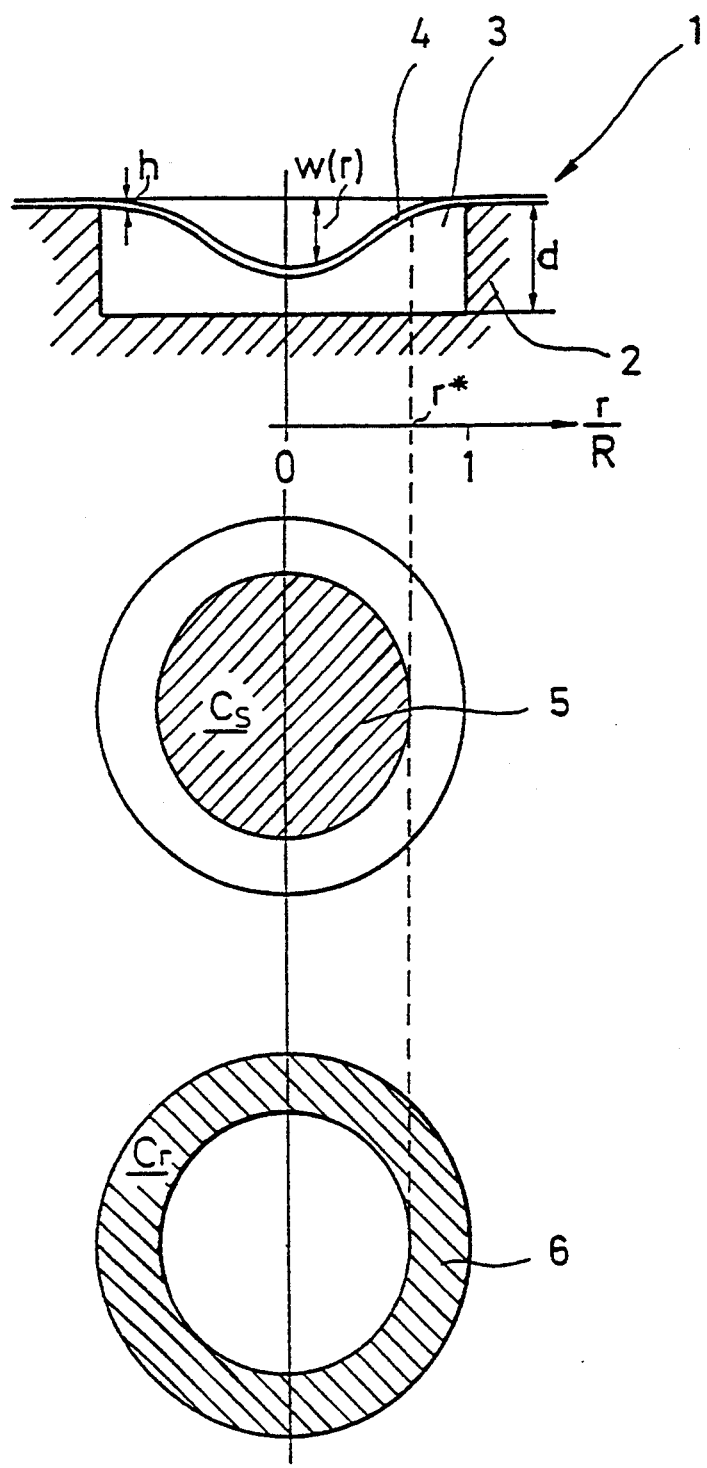
FIG. 19 is a schematic representation of the pressure sensor structure of FIG. 17.

The electrode structure (electrode and counter-electrode) shown in FIGS. 13 and 14 is suited to being operated with the differential-path amplifier of FIG. 4. The simplified electrode/counter-electrode structure of FIGS. 15 and 16 can only be operated with the simple amplifier circuit of FIG. 7.

Figure 12:
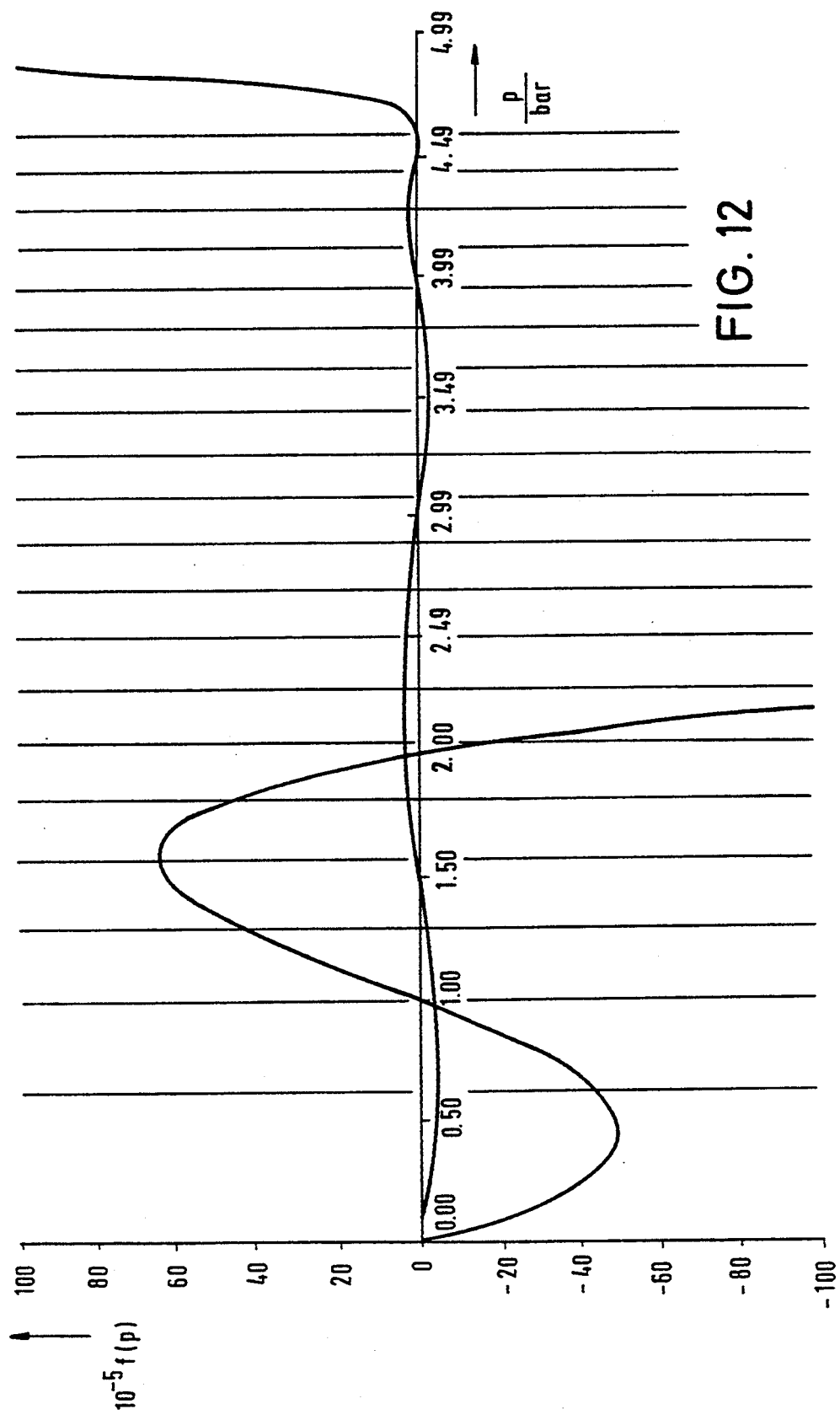
FIG. 12 shows a comparison between the linearity error of the pressure-measuring arrangement in accordance with the fundamental concept and that of the pressure-measuring arrangement in accordance with the invention.

In FIG. 12, the error function or linearity error of the pressure sensor arrangement according to the fundamental concept described with reference to FIGS. 1 to 9 is compared with the pressure-measuring arrangement according to the invention. It can be seen that with the features of the invention, a very small and minimal linearity error of less than 0.01 percent is achieved over an extended pressure range. The maximum pressure range lies just below the so-called bearing pressure $p_0$, at which the opposite electrodes of the diaphragm and the sensor body touch.

Therefore, compared with the operating-pressure range of the pressure sensor arrangement according to the fundamental concept described with reference to FIGS. 1 to 9, the operating pressure range of the pressure-measuring arrangement according to the invention can be more than doubled.

I claim:

1. A pressure-measuring arrangement comprising
a pressure-sensor structure comprising a diaphragm whose pressure-dependent deflection is measurable capacitively by means of a first electrode being a measuring electrode disposed on the diaphragm and forming a first capacitance together with a fixed counter-electrode being a pressure-dependent measuring capacitance,
a second electrode forming a second capacitance together with the fixed counter-electrode and disposed on the diaphragm in such a way that the second capacitance is pressure-dependent,
the first and second electrodes each having a variable radius,
a third electrode forming a constant reference capacitance together with the fixed counter-electrode,
an evaluating circuit which derives the pressure by a capacitance measurement and has the following transfer function:

$$F = [C_s(p) - C_r]/C_f(p)$$

where $C_s$ is the measuring capacitance, $C_r$ is the constant reference capacitance, and $C_f$ is the second capacitance, and wherein the first electrode and the second electrode are separated by a boundary having an angularly extending profile which varies as a function of the variable radius of the first electrode and the variable radius of the second electrode.

2. A pressure-measuring arrangement as claimed in claim 1 wherein the measuring electrode and the second electrode are separated by an essentially constant distance.

3. A pressure-measuring arrangement as claimed in claim 2 wherein the radius-dependent angle profile $a(r^*)$, starting at approximately 90° in the area of the center, assumes a maximum value between 110° and 130° before approaching 0° in the radially outer area of the measuring electrode and the second electrode at about a normalized radius $r^*_{fmax} = 0.74$.

4. A pressure-measuring arrangement as claimed in claim 1 wherein the pressure sensor structure has a reference electrode forming a reference capacitance $C_r$ which is implemented in a radially outer area of the diaphragm.

5. A pressure-measuring arrangement as claimed in claim 4 wherein the reference electrode is disposed on a normalized radius range between approximately 0.78 and approximately 0.97.

6. A pressure-measuring arrangement as claimed in claim 5 wherein said radius-dependent angularly extending profile lies between 100° and 120° in the normalized radius range between 0.1 and 0.25, passes through a minimum of approximately 90° at a normalized radius of approximately 0.375, and reaches maximum between 110° and 125° in the normalized radius range between 0.45 and 0.55 before approaching 0° at a normalized radius of approximately 0.74.

* * * * *